United States Patent [19]

Chiba

[11] Patent Number: 5,186,555
[45] Date of Patent: Feb. 16, 1993

[54] KEY ARRANGEMENT FOR WORD PROCESSOR OR THE LIKE ELECTRODE INSTRUMENT OR MACHINE

[76] Inventor: Ueru Chiba, 28-8, Kami-Shakujii 1-chome, Nerima-ku, Tokyo 177, Japan

[21] Appl. No.: 696,566

[22] Filed: May 8, 1991

[51] Int. Cl.⁵ .............................................. B41J 5/28
[52] U.S. Cl. .................................... 400/485; 400/91; 400/100
[58] Field of Search ............... 400/485, 486, 487, 488, 400/489, 490, 100, 91, 92, 95; 340/711; 235/145 R

[56] References Cited

U.S. PATENT DOCUMENTS 4,584,443  4/1986  Yaeger .................... 235/145 R
4,680,577  7/1987  Straayer et al. ................. 400/485
4,931,781  6/1990  Miyakawa ..................... 340/711

OTHER PUBLICATIONS

IBM Technical Disclosure Bulletin, vol. 26, No. 7B, Dec. 1983—R. W. Truelson.

*Primary Examiner*—Edgar S. Burr
*Assistant Examiner*—Lynn D. Hendrickson
*Attorney, Agent, or Firm*—Keck, Mahin & Cate

[57] ABSTRACT

A keyboard, for use in a workprocessor or like electronic machine, includes multiple keys arranged in an array of rows and columns, a stationary base, a moveable operator connecting each key and the stationary base such that each key is moveable in four diagonal directions relative to the remaining keys, and spring strips and switch contacts disposed beneath each key and arranged such that movement of the key in any of the four diagonal directions closes a respective switch contact to produce a distinct function, e.g., an al0phanumeric character.

10 Claims, 4 Drawing Sheets

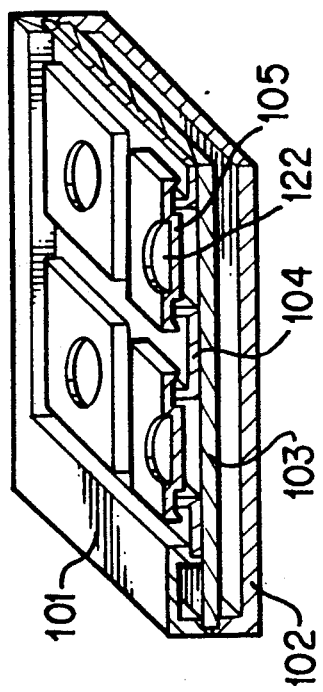
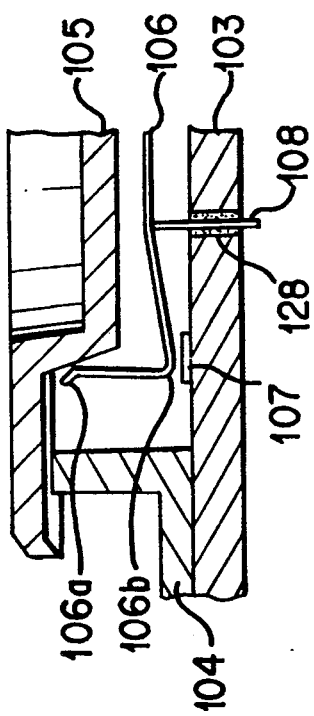
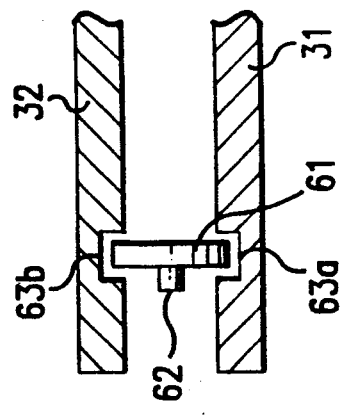
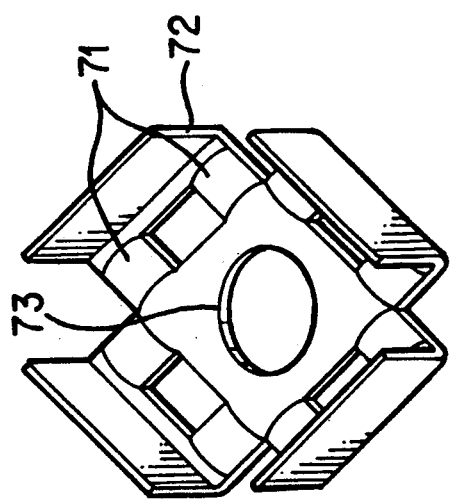
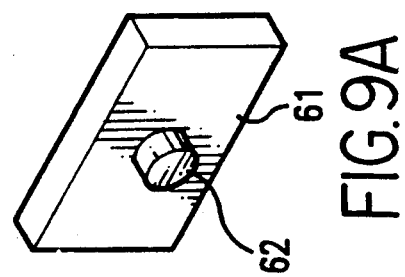

KEY ARRANGEMENT FOR WORD PROCESSOR OR THE LIKE ELECTRODE INSTRUMENT OR MACHINE

BACKGROUND OF THE INVENTION

The present invention relates to a keyboard of a word processor, typewriter and the like electronic instruments and machines.

PRIOR ART

Key arrangement of the standard keyboard of word processor, typewriter or the like instruments or machines, takes a form of horizontally rather longer style. In certain models, switch means are provided at right and left sides of the keyboard, specifically destined for respective hands of the operator, for the purpose of improving the operability of the machine.

In conventional keyboards, key switches are designed to be of single contact mode or in other words, only a single switch unit is attributed to each operating regular key. However, certain control keys have multidirectional switches.

As for conventional multidirectional keys, some of them utilizes push-down mode one. Another utilizes inclinedly operating mode.

SUMMARY OF THE INVENTION

It is an object of the present invention to provide a minimum-sized key arrangement with use of a multidirectional switching mechanism per key of the board.

A further object is to provide a keyboard providing a unique operability imposing upon the operator.

A still another object of the invention is to provide an improved keyboard, keys thereof being operable on a horizontal plane, thereby providing no push-down mode of manipulating operation.

For attaining the foregoing several objects, the present improved key arrangement comprises: a number of significant keys arranged substantially in an array and operable by both hands of an operator, placed in opposition to each other when seeing in lateral direction of the keyboard; and a common stationary base member mounting said keys only slidably in four diagonal directions relative to each of said keys and on a commmon horizontal plane. In the key arrangement, wherein each of said keys carries four alphabets and/or mathematical digits. Further, five alphabetical vowels are placed at corners of three significant keys in such a manner that they are operable by fingers of lefthand of the operator. Still further, all or certain of said keys carry further thereon rather rarely used consonant alphabets. In addition, rather frequently used consonant alphabets are carried on selected corners of such keys which are operable with fingers of operator's righthand. Still further, rather frequently used consonant alphabets and mathematical digits 0, 1, 2, 3, 4, 5, 6, 7, 8, and 9 are carried on corners of rather centrally arranged keys, In addition thereto, ten keys' digits are placed on corners of rather rightsidely arranged keys. Each of said keys is formed on its upper surface with a round recess for receiving finger end of the operator for allowing four diagonal movements of the key acting as a slide. It should be noted that four spring strips are provided substantially in a square form for allowing four different switching actions of the key.

These and further objects, features of the invention will become more apparent in the following description and accompanying drawings.

BRIEF DESCRIPTION OF THE DRAWINGS

FIG. 9(A) is a perspective view of a switching pusher.

FIG. 9(B) is a sectional view of the switch pusher shown in FIG. 9(A), together with two members holding the pusher in position.

FIG. 10 is a perspective view of an assembly which is composed of four switching units made into one set.

FIG. 11 is a sectional perspective view of a modified key structure.

FIG. 12 is an enlarged sectional view of a part of a still modified key structure, using a substantially L-shaped pressurizing spring.

PREFERRED EMBODIMENTS

In the following, preferred embodiments of the invention will be described in detail with reference to the drawings.

Figure 1:
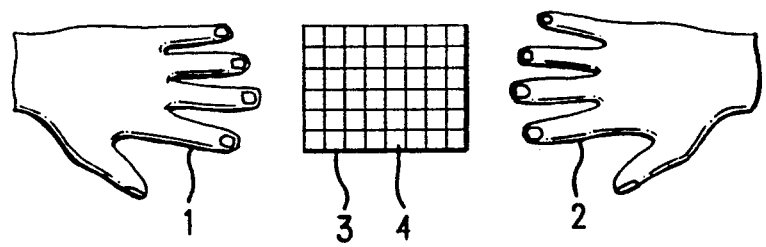
FIG. 1 shows a schematic plan view of a keyboard according to the present invention, together with a unique operating positioning of both hands of an operator.

In FIG. 1, an embodiment of the keyboard or panel 3 is shown only in schematic top plan view. The keyboard is composed of a group of compound keys arranged in array and movable in four diagonal directions and denoted generally with 4 only in FIG. 1 and more specifically in different ways for specific and individual operations in FIGS. 2 and 3.

Reference numeral 1 represents the left hand of an operator, while reference numeral 2 denotes his right hand. Therefore, it will be seen that the compound keys are manipulated in service with these both hands from the opposite lateral directions.

Character key group 11 includes three character keys arranged in a vertical line and carrying on each surface, such vowels as I; A; U; E and O, and additionally rather frequently used consonants V; X and B; F, Z and C; P; respectively.

A corner of the uppermost key of the second row carries a consonant "J", thus belonging only partially to the key group 11. Key members of the group 11 are operated with index finger, middle finger and ring finger of the left hand of the operator when counted from below of FIGS. 1, 2 and 3.

Figure 3:
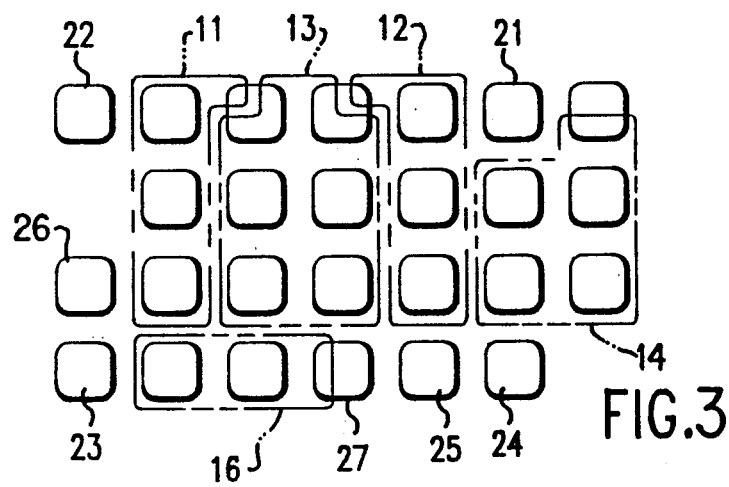
FIG. 3 is a somewhat simplified plan view of the key arrangement.
Figure 2:
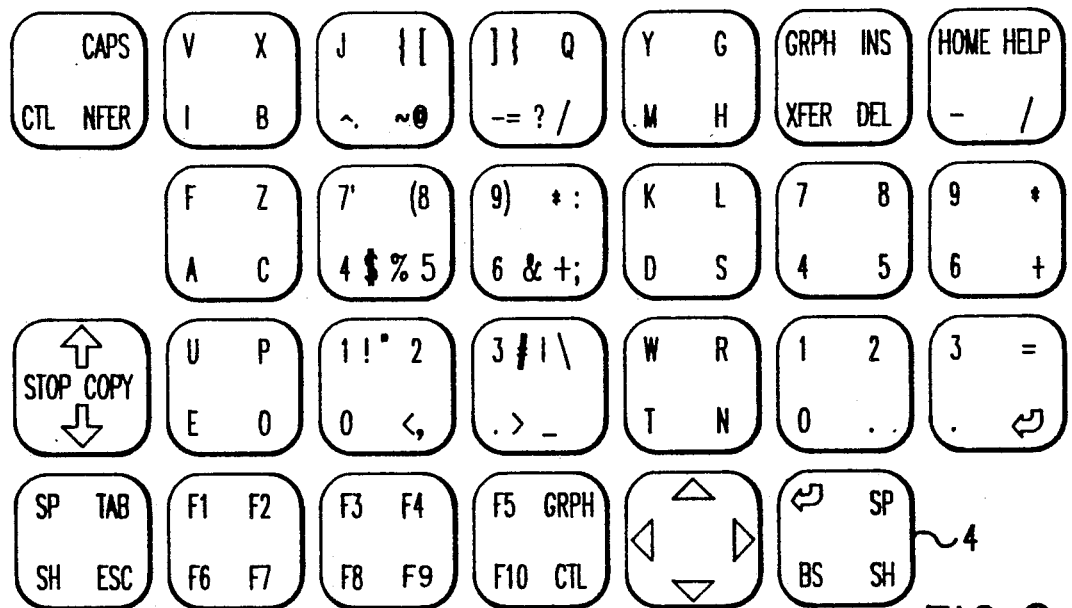
FIG. 2 is a top plan view of the keyboard having a preferred arrangement of characters, numerals, and several function- and operation keys.

Reference numeral 12 represents a further key group consisting whole and part of four compound keys arranged at an intermediate central distance from and substantially in opposition to the foregoing key group 11 and carry thereon several consonant characters, as seen in FIGS. 2 and 3 in combination. These keys are manipulated in service with index finger, middle finger and ring finger of the right hand of the operator.

Reference numeral 13 represents a group of compound keys which consist of several symbol keys, carrying symbol marks ; % and the like and are arranged at a central zone positioned between said key groups 11 and 12. These are brought into function by depressing a shift key, as usual.

Reference numeral 14, FIG. 3, represents still a further group of compound keys representing several numerals (ten keys) and symbols as shown.

There are arranged a group in total or more specifically two full and one partially denoted compound function keys 16 representing F1; F2; F3; F4; F5; F6; F7; F8; F9 and F10. These function keys are for specifying additional functions of the machine and adapted for manipulation mainly by the s indexing finger of the left hand.

21 represents a control key adapted for manipulation by the little finger of the righthand.

22 represents a further control key which is to be manipulated by the little finger of the lefthand.

23 represents still a further control key manipulated by the thumb of the lefthand.

24 represents still another control key which is adapted for manipulation by the thumb of the righthand.

25 represents a cursor key mounted in position as shown. This key is adapted for manipulation with the index finger of the righthand.

26 represents a first control key which is to be manipulated by the index finger of the lefthand. Both keys 25 and 26 are arranged nearly at both vertical ends of the panel and in a staggered way in two rows, as shown.

As a matter of fact, the key arrangement may be modified so as to meet with different languages an depending upon the design of the machine.

Figure 4:
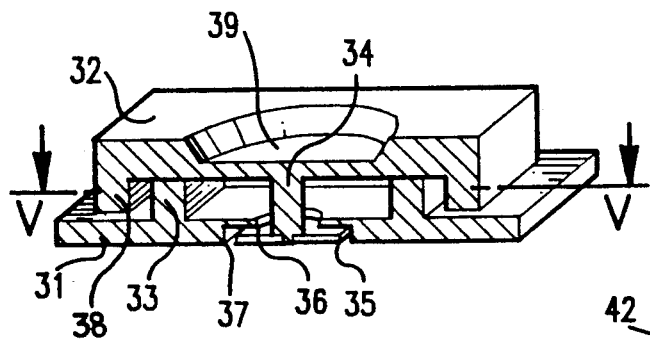
FIG. 4 is a sectional perspective view of a key unit employed in the inventive keyboard, taken along a chain-dotted section line V—V in FIG. 4.

FIG. 4 is a sectional perspective view of a representative key for setting forth a generalized description of structure and function thereof.

Numeral 31 represents a support base or main stationary member which constitutes a part of the substrate of the panel. Of course, the whole number of these support base elements are all continuous one after another and cover the whole area of the panel. The support base 31 is formed with an upwardly protruding continuous wall portion 33 so as to provide an upwardly opening inside space encasing several switching constituents to be described.

32 represents a switching slide member having a round recess 39 adapted for receiving a finger's end of the operator, when seen from above. This switching slide rides over the square-formed flat end surface of the vertical wall 33. Each key may have dimensions of 20 mm×20 mm, as measured on my hand-made model machine. Key gaps "g" between vertical as well as horizontal key rows may be 2 mm.

At the center of slide member 32, a round pillar 34 vertically depends and passes with sufficient idle spaces through a through-opening 36 formed in the support base 31.

35 represents a movable positioner which is fixedly mounted at the tip end of central pillar 34. Slide member 32 is slidably mounted on the upper surface of wall 33 and thus can not move even if a downward pressure should be applied onto the slide from above. In this way, the slide member 32 can move only on a horizontal plane, and other moving possibilities are positively prevented by virtue of the provision of pillar 34 and positioner 35. In addition, for this purpose, a bored recess 37 is formed in the back of the support member 31 of ample dimensions to allow the positioner 35 make specifically limited motions.

Slide member 32 is formed on its upper surface with a round recess 39 for receiving operator's finger end. Along the four side extremities of slide 32, downwardly extending end walls are formed, as shown in FIG. 4, so as to provide a kind of outer frame structure 38 and for encircling the upwardly directing wall structure 33 on the support member 31 with ample horizontal idle spaces when the related key is in off-service.

Figure 5:
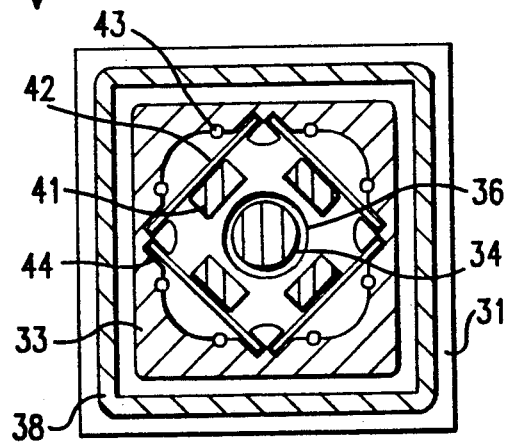
FIG. 5 is a horizontal section of a key unit shown in FIG. 4.

FIG. 5 is a horizontal section of a standarized key assembly taken on a section line V—V, shown in chain-dotted line in FIG. 4.

Referring now to FIGS. 4 and 5, in combination, reference numeral 41 represents four depending projections mounted fixedly on slide member 32 in a square arrangement as a whole and kept nearly in contact with respective spring end strips 42. Each spring strip 42 is laterally curved for increasing the value of spring constant, as most clearly shown in FIG. 7 in perspective style. When a horizontal pressure is directed in one diagonal direction of the movable member 32 by finger end manipulation of the related key, the spring strip will be deflected outwardly as a whole by pressure contact with the related projection 41, resulting in closure of the related switch contacts 43 to close the related electric circuit, not specifically shown. Both ends of each of these spring strips 42 are held in position by engagement with holding grooves 44 of wall member constituting main portion of slide 33. Each of projections 41 has a square cross-section, the outermost one of four side surfaces thereof being positioned in parallel with the related strip spring 42, in order to serve as a pressurizing actuator for the latter.

Figure 6A:
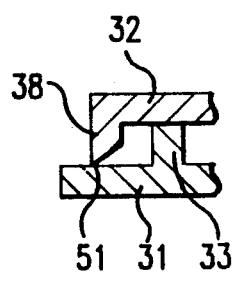
FIG. 6 is an enlarged vertical section of three modifications of part of the key unit, shown in FIG. 4.
Figure 6B:
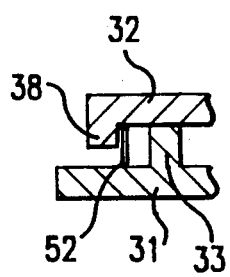
Figure 6C:
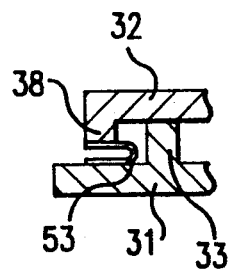

FIG. 6 is an enlarged sectional view of three modes (A), (B) and (C) of outer frame 38 having a slidable seal.

At (A), showing the first embodiment, outer frame 38 of the movable slider 32 represents somewhat extended and knife-edged lower end 51 acting as a slidable and sealing extension relative to stationary support 31.

In a second embodiment shown at (B), an auxiliary member acting as a sealing wall 52 is provided between two members 31 and 32 and at an inside position relative to outer wall 38.

In a third embodiment shown at (C), an elongated U-bend style sealing member 53 is provided for the same purpose as above.

Figure 7:
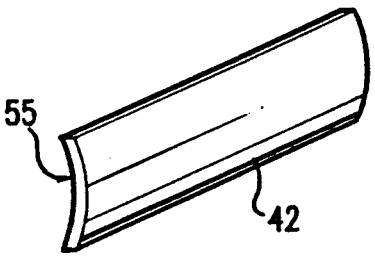
FIG. 7 is an enlarged perspective view of a spring strip which constitutes a snap switch member.

FIG. 7 is an enlarged perspective view of the spring strip 42, as was referred to only briefly hereinbefore. Normally, these four strips are arranged in a key unit as was shown in FIG. 5 for providing four selective diagonal switching movements. This spring strip 42 has a laterally curved configuration over its whole length as hinted by reference numeral 55. When this spring strip has been pressed into contact-making position and then is released, a quick return or snapping action could be brought about for quick and perfect switching off.

Figure 8:
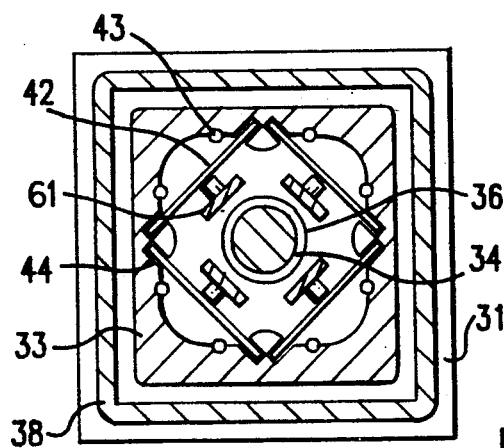
FIG. 8 is a modification of FIG. 5.

FIG. 8 is a slight modification of FIG. 5.

In this modification, the foregoingly used, square-sectioned projections 41 have been replaced by stationary plate-and-projection combination. Plate or main body is shown at 61 and a unitary outwardly directing small projection is shown at 62.

As will be clearly understood the overall operation of these two embodiments are the same.

At FIG. 9(A), the main body 61 together with actuator projection 62 is shown, as having been positioned between movable member or key per se 32 and stationary member 31. More specifically, in this case, support member 31 is formed with a reception groove 63a. Similarly, slide member 32 is formed with a substantially same reception groove 63b physically in opposition to said groove 63a, when the slide 32 is kept in its non-service position as shown. Between these two reception grooves, main body 61 is held in shown position. However, although not shown, any convenient projecting holders may be employed instead of the groove structure shown and described.

In operation, when slide member 32 is moved in the thickness direction of main body 61, a pressure is applied therefrom through its actuating projection 62 onto snap spring 42, the latter being thereby subjected to flexing for closing the nearby-lying contact pair 43, FIG. 5, as an example. Preferably, the length of lower reception groove 63a may be selected to be equal to plate-like main body 61, while the length of upper reception groove 63b may be made longer.

If occasion may desire, the actuating projection 62 may be modified to direct downwards instead of horizontal. In this case, the design may be such that the spring strip 42 may be arranged to be horizontal as hithertobefore, relative to the support member 31.

FIG. 10 represents a perspective view of a pressure spring assembly wherein corresponding parts of four springs 42 and for actuating plates 61 utilized hereinbefore have been united into one unit. Here, four spring members 71 correspond in action to those denoted with 42.

Next, referring to a further modification shown in FIG. 11, reference numeral 101 represents an upper case cover of a keyboard, while reference numeral 102 represents a bottom case cover.

103 represents a circuit board carrying thereon various conventional electric circuits, although not shown. Switching elements are also mounted on this intermediate board 103, although not shown.

104 represents a channel-shaped support which supports neighboring parts of switching keys or movable slide members 105 each having a circular recess 122 on a topface. In this case, also, these slides can move exclusive on a common horizontal plane as before. In this present embodiment, upper cover 101 and support channel 104 have been separated from each other. When occasion may desire, these two members 101 and 104 may be made solid and unitary.

In a modification shown in FIG. 12, substantially L-shaped spring 106 is utilized in place of straight one which was shown at 42 in FIG. 7. When the movable member 105 is moved leftwards, pressure will be exerted on the upwardly directing end 106a of the L-shaped spring will be pressed in the same direction and the crooked bend 106b thereof is moved downwards until it will establish and maintain contact with a stationary contact 107 provided fixedly on circuit board 103. In this action, provision of a downwardly extending branch leg 108 which passes fixedly through a vertical opening 128 formed in stationary base member 103 will assist the foregoing disclosed downward action with switch contact 107 by acting as a fixed point.

Figure 13:
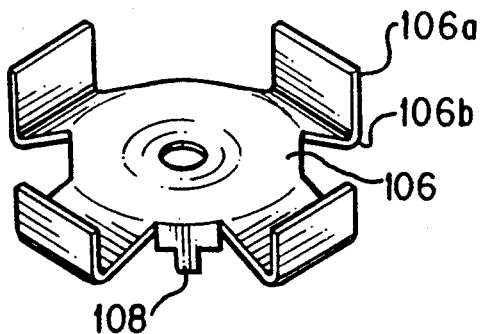
FIG. 13 is a perspective view of a further modification of the composite spring structure shown in FIG. 2.

FIG. 13 illustrates a united spring unit wherein the four springs 106 are united into one composite unit in its entirety and shown in a perspective view. As seen, this spring unit comprises four vertical leaves 106b which are united into one. In FIG. 13, however, the slightly curved ends 106a have been shown in a highly simplified mode for clearer understanding of the drawing. Only one of four branch legs 108 is seen.

Figure 14:
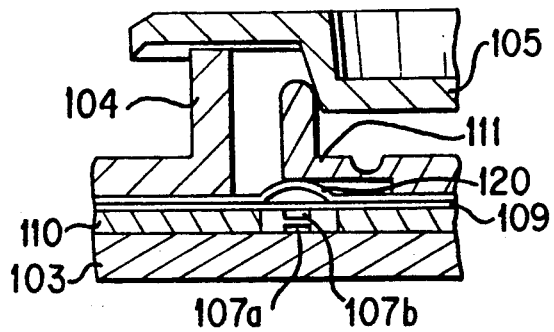
FIG. 14 is a modification of FIG. 12.

In the modification shown in FIG. 14, the foregoing L-shaped spring 106 has been replaced by a solid state angle 111. By the provision of this solid state angle 111, lateral leftward manipulation of movable slide 105, solid state L-member 111 will be forced to move downwards, thereby a thin-walled portion 120 and thus the L-member will be flexed or bent at the somewhat elastic zone at 109. In this way, a pair of switch contacts 107a; 107b will become closed with each other.

Figure 15:
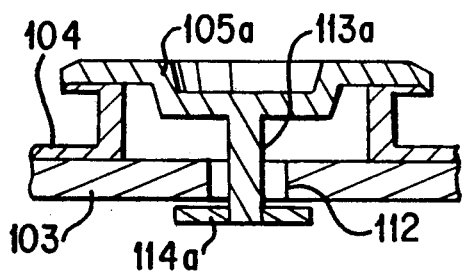
FIG. 15 is still a modification of FIG. 12.

In a further embodiment shown in FIG. 15, circuit board 103 is formed with a small through-opening 112, while slide member 105a on support member 104 is formed with a rather longer, downwardly extending pillar projection 113a which passes enough through the opening 112. A small positioning plate 114a is fixedly mounted on the tip end of said pillar projection 113a. Thus, the slide member 105a is positively prevented from any disadvantageous dismantling from its service positions.

Figure 16:
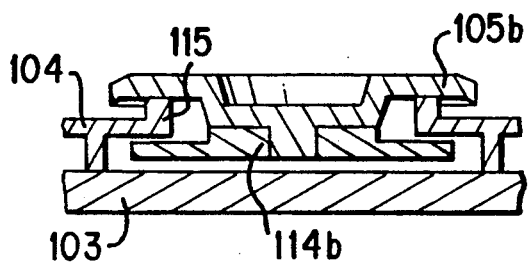
FIG. 16 is a still another modification of FIG. 12.

In a further modification shown in FIG. 16, support plate 104 is formed with upwardly extending wall portions 115, which are loosely squeezed between key per se or slide member 105b and stopper or position limiters; 114b. In this way, the slide member 105b is kept in a horizontally slidable relationship with the stationary support member 103.

Figure 17:
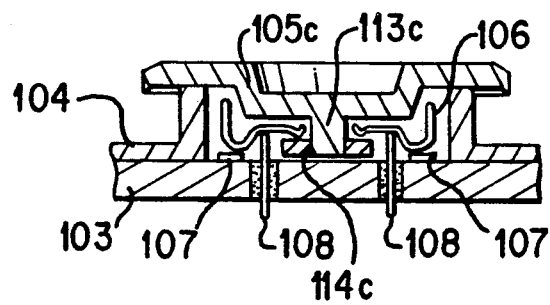
FIG. 17 is a still further modification of FIG. 12.

In the last embodiment shown in FIG. 17, reference numeral 103 represents a circuit board as before, while 104 shows a support member. 105c illustrates slide member or key per se. 106 shows a pair of substantially L-shaped spring members. 107 denotes a pair of remotely arranged circuit contacts. 108 represents a pair of spring branch legs. 113c a depending central pillar 114c represents stoppers or position limiters.

When comparing this FIG. 17 with FIG. 12 and its explanation, it will be easily understood that the present modification illustrates substantially a doubled arrangement of the foregoing mechanism shown therein.

What is claimed is:

1. Key arrangement in a keyboard of a word processor or the like electronic instrument or machine, comprising in combination:

a plurality of keys arranged substantially in an array of rows and columns having a distance between adjacent keys, means mounting each of said plurality of keys for movement in four diagonal directions relative to the remaining keys, means to produce a different distinguishable function responsive to movement of a key in each of said diagonal directions; and a common stationary base member mounting said plurality of keys to be only slidably movable in said four diagonal directions relative to each of said keys and on a common horizontal plane.

2. Key arrangement of claim 1, wherein each of said keys carries one of letters and mathematical digits in each corner.

3. Key arrangement of claim 2, including five alphabetical vowels placed at corners of three significant keys for operation by fingers of lefthand of the operator.

4. Key arrangement of claim 3, wherein certain of said keys carry rarely used consonant letters.

5. Key arrangement of claim 1, wherein frequently used consonant letters are carried on selected corners of keys which are operable with fingers of an operators' righthand.

6. Key arrangement of claim 1, wherein frequently used consonant alphabets and mathematical digits 0, 1, 2, 3, 4, 5, 6, 7, 8, and 9 are carried on corners of centrally arranged keys.

7. Key arrangement of claim 1, wherein ten keys' digits are placed on corners of keys arranged on the right side.

8. Key arrangement of claim 1, wherein each of said keys is formed on its upper surface with a round recess for receiving finger end of an operator for allowing said four diagonal sliding of the key.

9. Key arrangement of Claim 1, wherein four spring strips are provided substantially in a square form for allowing four switching actions of the key.

10. A manual digital data input device comprising:
a plurality of keys arranged substantially in an array of rows and columns having a distance between adjacent keys, wherein each of said keys is moveable in four diagonal directions movement in each direction produces a distinguishable function, and each of said plurality of keys comprises:
a switching slide member having a round recess on a top side adapted for placement of a finger tip;
a round pillar having a tip end extending from a bottom side of the switching slide member;
a moveable positioner fixedly mounted at a tip end of the round pillar;
end walls extending downward from the switching slide member;
a plurality of spring end strips connected beneath the switching slide member;
a plurality of switch contacts; and
a plurality of holding grooves wherein when the switching slide member is directed in a diagonal direction a respective holding groove is forced against a respective spring end strip to close a respective switch contact; and
a support base in a position beneath the plurality of keys comprising;
a plurality of upwardly protruding wall portions wherein each wall portion is adapted to have a respective key slideably mounted on top; and
a plurality of bored recesses formed in the support base for receiving a respective pillar of a respective key.

* * * * *